US012795801B2

(12) United States Patent
Borra et al.

(10) Patent No.: US 12,795,801 B2
(45) Date of Patent: Nov. 10, 2026

(54) SELECTING LIGHTING DEVICES BASED ON AN INDICATED LIGHT EFFECT AND DISTANCES BETWEEN AVAILABLE LIGHTING DEVICES

(71) Applicant: SIGNIFY HOLDING B.V., Eindhoven (NL)

(72) Inventors: Tobias Borra, Rijswijk (NL); Dzmitry Viktorovich Aliakseyeu, Eindhoven (NL); Dragan Sekulovski, Eindhoven (NL); Bartel Marinus Van De Sluis, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 11 days.

(21) Appl. No.: 18/998,603

(22) PCT Filed: Jul. 14, 2023

(86) PCT No.: PCT/EP2023/069627
§ 371 (c)(1),
(2) Date: Jan. 27, 2025

(87) PCT Pub. No.: WO2024/022846
PCT Pub. Date: Feb. 1, 2024

(65) Prior Publication Data

US 2025/0338379 A1 Oct. 30, 2025

(30) Foreign Application Priority Data

Jul. 26, 2022 (EP) .................................... 22186957

(51) Int. Cl.
*H05B 47/155* (2020.01)
*H05B 47/115* (2020.01)

(52) U.S. Cl.
CPC ......... *H05B 47/155* (2020.01); *H05B 47/115* (2020.01)

(58) Field of Classification Search
CPC .... H05B 47/155; H05B 47/115; H05B 47/19; H05B 47/1985
See application file for complete search history.

(56) References Cited

U.S. PATENT DOCUMENTS 11,013,090 B2 5/2021 Bergman et al.
2013/0147395 A1* 6/2013 Cook .................. H05B 47/155 315/312

(Continued)

FOREIGN PATENT DOCUMENTS

WO WO-2020114812 A1 * 6/2020 ......... H05B 47/1985
WO WO-2020114812 A9 * 6/2021 ......... H05B 47/1985
WO 2021233733 A1 11/2021

*Primary Examiner* — Raymond R Chai

(57) ABSTRACT

A method of controlling one or more lighting devices to render a light effect comprises obtaining (101) distance information indicative of distances between a plurality of lighting devices, receiving (103) an input signal indicative of the light effect, selecting (105) a set of lighting devices from the plurality of lighting devices based on the light effect and the distances, wherein a first set of multiple lighting devices is selected if said light effect is a moving light effect and a second set of multiple lighting devices is selected if said light effect is a non-moving light effect, said second set of lighting devices being larger than said first set of lighting devices, said moving light effect being a light effect that moves across multiple lighting devices, and controlling (107) only the selected set of lighting devices to render the light effect.

14 Claims, 5 Drawing Sheets

(56) References Cited

U.S. PATENT DOCUMENTS

| | | | |
|---|---|---|---|
| 2018/0376564 A1 | 12/2018 | Van De Sluis et al. | |
| 2019/0069379 A1 | 2/2019 | Kastee et al. | |
| 2020/0008285 A1* | 1/2020 | Paolini .................. | H05B 45/20 |
| 2020/0029411 A1* | 1/2020 | Barna .................. | F21V 23/003 |
| 2021/0092817 A1 | 3/2021 | Bergman et al. | |

* cited by examiner

SELECTING LIGHTING DEVICES BASED ON AN INDICATED LIGHT EFFECT AND DISTANCES BETWEEN AVAILABLE LIGHTING DEVICES

CROSS-REFERENCE TO PRIOR APPLICATIONS

This application is the U.S. National Phase application under 35 U.S.C. § 371 of International Application No. PCT/EP2023/069627, filed on Jul. 14, 2023, which claims the benefit of European Patent Application No22186957.1, filed on Jul. 26, 2022. These applications are hereby incorporated by reference herein.

FIELD OF THE INVENTION

The invention relates to a system for controlling one or more lighting devices to render a light effect.

The invention further relates to a method of controlling one or more lighting devices to render a light effect.

The invention also relates to a computer program product enabling a computer system to perform such a method.

BACKGROUND OF THE INVENTION

With the introduction of pixelated lighting devices (e.g. the Hue Gradient light strip), a wealth of dynamic light effects is possible. A key aspect in creating these dynamic effects is how pleasing they are, especially with the knowledge that most people prefer effects with a particular amount of 'naturalness'. Here, naturalness could be a semblance to actual real world occurrences, such as clouds or flames, or it could be in the domain of temporal frequency, such as the smoothness of the effect, as well as parameters like intensity, fluctuation over time, and motion. Especially in the case of motion, care should be taken to create motion that adheres to real-world properties, since these will be most pleasing to an observer.

U.S. 2021/0092817 discloses a method of generating a dynamic light effect on a light source array. The method comprises obtaining or generating a vector, wherein the vector has a plurality of behavior parameters comprising at least a speed and a direction, and the vector has one or more appearance parameters comprising at least a color and/or a brightness, mapping the vector onto the light source array over time according to the behavior parameters of the vector, and controlling the light output of the plurality of light sources over time according to the mapping of the vector onto the light source array and according to the appearance parameters of the vector.

Similar dynamic effects can be rendered with multiple single-pixel lighting devices, but a light effect designed for a pixelated lighting device does not always look nice when rendered with multiple single-pixel lighting devices.

SUMMARY OF THE INVENTION

It is a first object of the invention to provide a system, which can orchestrate the rendering of a light effect involving multiple lighting devices while preventing that the multiple lighting devices appear to render unrelated light effects.

It is a second object of the invention to provide a method, which can be used to orchestrate the rendering of a light effect involving multiple lighting devices while preventing that the multiple lighting devices appear to render unrelated light effects.

In a first aspect of the invention, a system for controlling one or more lighting devices to render a light effect comprises at least one input interface, at least one transmitter, and at least one processor configured to obtain distance information via said at least one input interface, said distance information being indicative of distances between a plurality of lighting devices, receive an input signal indicative of said light effect, select a set of lighting devices from said plurality of lighting devices based on said light effect and said distances, and control, via said at least one transmitter, only said selected set of lighting devices to render said light effect.

When lighting devices involved in rendering a light effect are too far apart, they may appear to be rendering unrelated light effects. For example, motion parameters may render less convincingly when the distances between the lighting devices are sub-optimal. By only selecting lighting devices that are sufficiently near each other to be able to render a certain light effect in a visually pleasing manner, this may be prevented. Not all light effects require the lighting devices involved in their rendering to be near each other and two light effects that both require the lighting devices involved in their rendering to be near each other may have different nearness/distance requirements.

For example, said at least one processor may be configured to select a first set of multiple lighting devices if said light effect is a moving light effect and a second set of multiple lighting devices if said light effect is a non-moving light effect, said second set of lighting devices being larger than said first set of lighting devices, said moving light effect being a light effect that moves across multiple lighting devices. Said second set may comprise all lighting devices of said plurality of lighting devices, for example.

Said at least one processor may be configured to select said set of lighting devices from said plurality of lighting devices such that for each of said set of lighting devices, a distance between said respective lighting device and at least one other lighting device of said set of lighting devices does not exceed a proximity threshold. This is a relatively straightforward implementation with behavior that is likely easy for a user to understand.

Said at least one processor may be configured to obtain further distance information via said at least one input interface, said further distance information being indicative of a user-perceived distance between a user and said plurality of lighting devices, and select said set of lighting devices from said plurality of lighting devices further based on said user-perceived distance between said user and said plurality of lighting devices. For certain light effects, the lighting devices need to be close enough together such that the light effect is perceived as a single light effect instead of as different light effects being rendered by different lighting devices. Whether lighting devices are close enough together typically depends on the distance between the user and the lighting devices, so this distance is preferably taken into account. The real distance may be assumed to be the user-perceived distance or alternatively, the real distance may be adjusted in order to more closely reflect the user-perceived distance.

Said at least one processor may be configured to obtain device type information indicative of device types of said plurality of lighting devices, and select said set of lighting devices from said plurality of lighting devices further based on said device types of said plurality of lighting devices. For example, lighting devices that are only able to render white light or only able to render white light with one color temperature may be excluded from the selected set of lighting devices.

Said at least one processor may be configured to obtain a dynamic input signal, said dynamic input signal being indicative of values of one or more environmental parameters over time, and determine consecutive light effect parameter values for said light effect based on said values of said one or more environmental parameters. Creating dynamic light effects is challenging, even with the correct tooling in place. Parameters like color, intensity, and smoothing play an important role, which is exacerbated as a function of the number and type of lighting devices in a particular setup.

By letting multi-pixel light effects, e.g. swarm-like effects, rendered on the selected set of lighting devices be directly driven by a dynamic input signal, the need for users or content creators to design their own effects is circumvented. The light effect may consist of a plurality of light particles that display swarm-like behavior, e.g. the light particles have a similar direction, speed, color, and/or intensity. Said one or more environmental parameters may comprise one or more of a detected activity, a detected motion, a detected sound property, a detected sound level, and a detected number of people, for example.

By combining the use of multiple lighting devices with a dynamic input signal, such as e.g. detected activity in a room, ambient sound levels, motion, and number of people, light effects may be created that look natural, cover a larger area and are responsive to the surroundings. Additionally, generating light effects in this manner makes for a more interactive, responsive experience than is possible with traditional light effects such as those based on Markov chains or scripted effects.

Said at least one processor may be configured to determine for said light effect a first set of light effect parameter values if an environmental parameter value indicated in said dynamic input signal exceeds a parameter threshold or a second set of light effect parameter values if said environmental parameter value indicated in said dynamic input signal does not exceed said parameter threshold, said first set of light effect parameter values being different from said second set of light effect parameter values. For example, if an ambient sound level threshold is crossed, the swarm intensity or number of particles may be adjusted.

Said at least one processor may be configured to obtain a content signal comprising audio and/or video content, and determine consecutive light effect parameter values for said light effect based on said audio and/or video content. For example, swarm effects may be based on the properties of audio or video content rendered on a media rendering device such as a loudspeaker and/or display screen, preferably while being adjusted to the position of the media rendering device or based on a virtual position of the content parts such as a spatial sound entity being rendered relative to multiple loudspeaker positions, or a video entity rendered on a part of a display screen.

Said at least one processor may be configured to obtain further distance information via said at least one input interface, said further distance information being indicative of a user-perceived distance between said plurality of lighting devices and a media rendering device rendering said audio and/or video content, and select said set of lighting devices from said plurality of lighting devices further based on said user-perceived distance between said plurality of lighting devices and said media rendering device. Whether lighting devices are close enough together may also depend on the distance between the media rendering device and the lighting devices. The real distance may be assumed to be the user-perceived distance or alternatively, the real distance may be adjusted in order to more closely reflect the user-perceived distance.

Said at least one processor may be configured to determine or adjust values of one or more light effect parameters of said light effect based on said distances. For example, the distance between the lighting devices may define how quickly/slowly each lighting device dims down or up to simulate the state when a "swarm pixel" is in between the two light sources.

Said at least one processor may be configured to obtain position information via said at least one input interface, said position information being indicative of positions of said selected set of lighting devices, and determine or adjust values of one or more light effect parameters of said light effect based on said positions. For example, a change in particle swarm behavior may be based on the positions of the lighting devices, e.g. towards the periphery of the set of lighting devices or towards a lighting device of a specific type.

In a second aspect of the invention, a method of controlling one or more lighting devices to render a light effect comprises obtaining distance information, said distance information being indicative of distances between a plurality of lighting devices, receiving an input signal indicative of said light effect, selecting a set of lighting devices from said plurality of lighting devices based on said light effect and said distances, and controlling only said selected set of lighting devices to render said light effect. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling one or more lighting devices to render a light effect.

The executable operations comprise obtaining distance information, said distance information being indicative of distances between a plurality of lighting devices, receiving an input signal indicative of said light effect, selecting a set of lighting devices from said plurality of lighting devices based on said light effect and said distances, and controlling only said selected set of lighting devices to render said light effect.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java(™), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
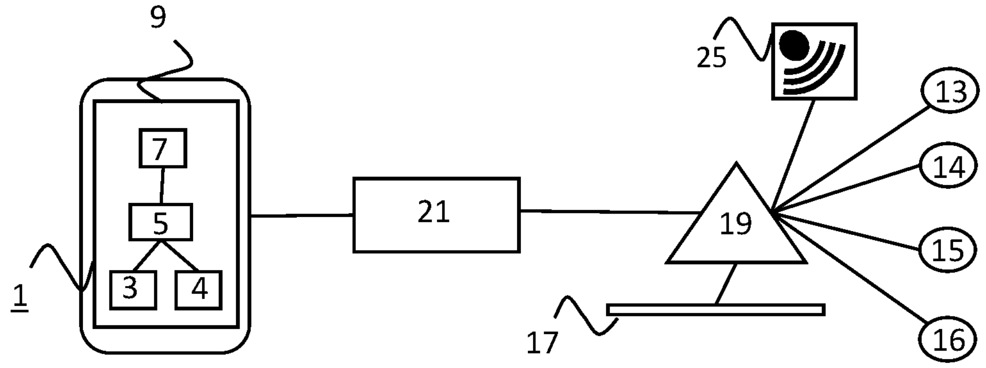
FIG. 1 is a block diagram of a first embodiment of the system.

FIG. 1 shows a first embodiment of the system for controlling one or more lighting devices to render a light effect. In the first embodiment, the system is a mobile device 1. The mobile device 1 may be a smart phone or a tablet, for example. In the example of FIG. 1, lighting devices 13-16 are single pixel lighting devices and lighting device 17 is a pixelated lighting device.

In the example of FIG. 1, The mobile device 1 can control lighting devices 13-17 via a bridge 19. The bridge 19 may be a Hue bridge, for example. The bridge 19 communicates with the lighting devices 13-17 using Zigbee technology, for example. The mobile device 1 is connected to the wireless LAN access point 21, e.g., via Wi-Fi. The bridge 19 is also connected to the wireless LAN access point 21, e.g., via Wi-Fi or Ethernet.

Alternatively or additionally, the mobile device 1 may be able to communicate directly with the bridge 19, e.g. using Zigbee technology, and/or may be able to communicate with the bridge 19 via the Internet/cloud. Alternatively or additionally, the mobile device 1 may be able to control the lighting devices 13-17 without a bridge, e.g. directly via Wi-Fi, Bluetooth or Zigbee or via the Internet/cloud.

The mobile device 1 comprises a receiver 3 a transmitter 4, a processor 5, a memory 7, and a touchscreen display 9. The processor 5 is configured to obtain distance information via the receiver 3 or the touchscreen display 9. The distance information is indicative of distances between the lighting devices 13-17. The processor 5 may be configured to obtain position information from the lighting devices 13-17 via the receiver 3 and determine the distances based on this position information. This position information may specify the positions of the lighting devices 13-17. Alternatively or additionally, the processor 5 may be configured to provide a user interface, e.g. via the touchscreen display 9 or via a voice interface, to allow the user to manually enter these distances or the positions of the lighting devices 13-17.

The processor 5 is further configured to receive an input signal indicative of the light effect, select a set of lighting devices from the lighting devices 13-17 based on the light effect and the distances, and control, via the transmitter 4, only the selected set of lighting devices to render the light effect. The input signal may be received from the touchscreen display 9 or from a microphone (not shown), for example. For instance, the processor 5 may be configured to allow the user to select a predefined light scene, e.g. for configuring or activating the light scene. The input signal may also be provided automatically when an event occurs, e.g. when a certain time has been reached or motion has been detected.

The processor 5 may be configured to obtain a dynamic input signal indicative of values of one or more environmental parameters over time, e.g. from sensor device 25, and determine consecutive light effect parameter values for the light effect based on the values of the one or more environmental parameters. The one or more environmental parameters may comprise one or more of a detected activity, a detected motion, a detected sound property, a detected sound level, and a detected number of people. The processor 5 may be configured to obtain this dynamic input signal and determine these consecutive light effect parameter values upon determining that this dynamic light effect is indicated in the input signal.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The memory 7 may comprise one or more memory units. The memory 7 may comprise solid state memory, for example.

The receiver 3 and the transmitter 4 may use one or more wireless communication technologies such as Wi-Fi (IEEE 802.11) to communicate with the wireless LAN access point 21, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may further comprise a camera (not shown). This camera may comprise a CMOS or CCD sensor, for example. The mobile device 1 may comprise other components typical for a mobile device such as a battery and a power connector. The invention may be implemented using a computer program running on one or more processors.

In the embodiment of FIG. 1, the system of the invention is a mobile device. In an alternative embodiment, the system may be another device, e.g., a laptop, personal computer, a bridge, a media rendering device, a streaming device, or an Internet server. In the embodiment of FIG. 1, the system of the invention comprises a single device. In an alternative embodiment, the system comprises multiple devices.

Figure 2:
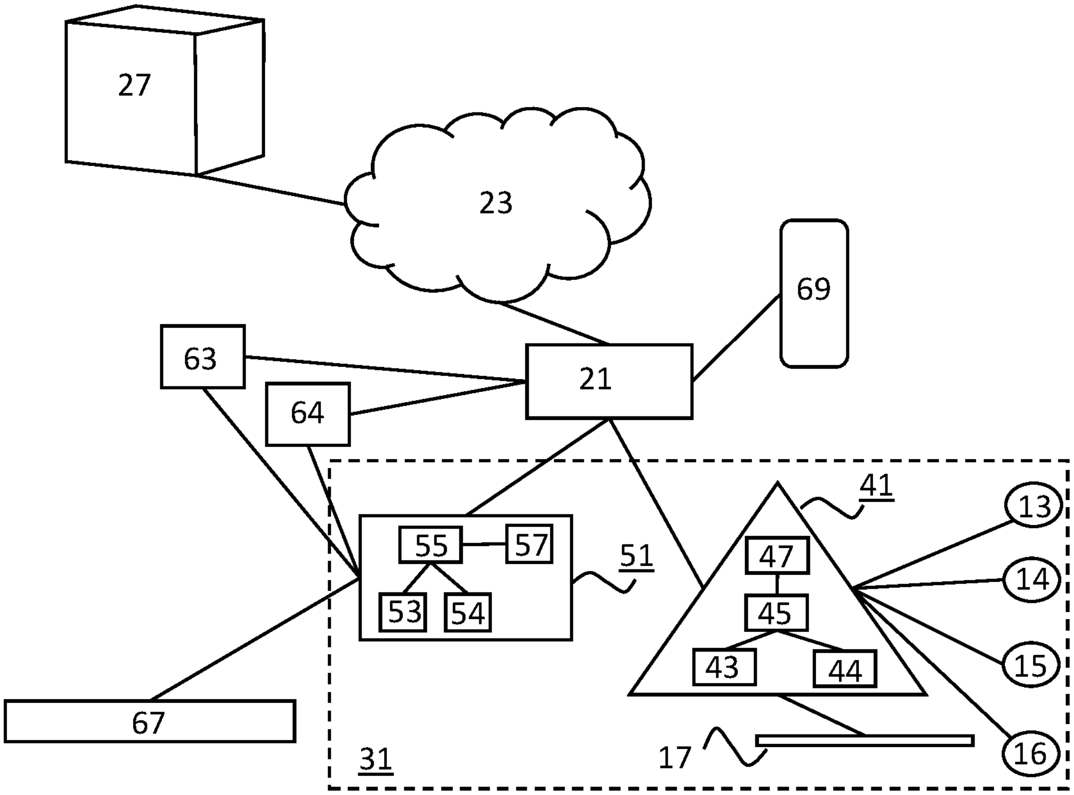
FIG. 2 is a block diagram of a second embodiment of the system.

FIG. 2 shows a second embodiment of the system for controlling one or more lighting devices to render a light effect. In the second embodiment, the system is a lighting system 31. The lighting system 31 comprises a bridge 41, an HDMI module 51, and lighting devices 13-17.

In the example of FIG. 2, the wireless LAN access point 21 is connected to the Internet 23. A media server 27 is also connected to the Internet 25. Media server 27 may be a server of a video-on-demand service such as Netflix, Amazon Prime Video, HBO Max, Hulu, Disney+ or Apple TV+, for example. The HDMI module 51 is connected to a display device 67 and local media receivers 63 and 64 via HDMI. The local media receivers 63 and 64 may comprise one or more streaming or content generation devices, e.g., an Apple TV, Chromecast, Amazon Fire TV stick, Microsoft Xbox and/or Sony PlayStation, and/or one or more cable or satellite TV receivers.

The bridge 41 comprises a receiver 43, a transmitter 44, a processor 45, and a memory 47. The HDMI module 51 comprises a receiver 53, a transmitter 54, a processor 55, and a memory 57. The processor 45 is configured to obtain distance information via the receiver 43. The distance information is indicative of distances between the lighting devices 13-17. The processor 45 is further configured to receive an input signal indicative of the light effect, select a set of lighting devices from the lighting devices 13-17 based on the light effect and the distances, and associate this set of lighting devices with the light effect, e.g. in memory 47.

The processor 55 is configured to control, via the transmitter 54, only the selected set of lighting devices to render the light effect. In the embodiment of FIG. 2, the processor

55 is configured to obtain a content signal comprising audio and/or video content, e.g. from local media receiver 63 or 64, and determine consecutive light effect parameter values for the light effect based on the values of the audio and/or video content.

The processor 55 may start to control the selected set of lighting devices to render the light effect when the user starts a certain mode manually or when this certain mode is started automatically, e.g. upon detecting a video signal. The processor 45 of the bridge 41 receives the control commands from the HDMI module 51 via the receiver 43 and transmits corresponding control commands to the set of lighting devices via the transmitter 44.

The control commands transmitted by the HDMI module 51 may identify the lighting devices or the light effect. The HDMI module 51 may ask the bridge 41 which set of lighting devices has been associated with the light effect. The bridge 41 may look up in its memory 47 which set of lighting devices has been associated with the light effect.

The processor 55 may be further configured to receive a further input signal indicative of a further light effect, select a further set of lighting devices from the lighting devices 13-17 based on the further light effect and the distances, and associate this further set of lighting devices with the further light effect, e.g. in memory 47. Another device, e.g. mobile device 69, may be configured to control, via the transmitter 54, only the selected set of lighting devices to render the further light effect.

In the embodiment of the bridge 41 shown in FIG. 2, the bridge 41 comprises one processor 45. In an alternative embodiment, the bridge 41 comprises multiple processors. The processor 45 of the bridge 41 may be a general-purpose processor, e.g. ARM-based, or an application-specific processor. The processor 45 of the bridge 41 may run a Unix-based operating system for example. The memory 47 may comprise one or more memory units. The memory 47 may comprise solid-state memory, for example. The memory 47 may be used to store a table of connected lights, for example.

The receiver 43 and the transmitter 44 may use one or more wired or wireless communication technologies, e.g. Ethernet for communicating with the wireless LAN access point 21 and Zigbee for communicating with the lighting devices 13-17, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 43 and the transmitter 44 are combined into a transceiver. The bridge 41 may comprise other components typical for a network device such as a power connector. The invention may be implemented using a computer program running on one or more processors.

In the embodiment of the HDMI module 51 shown in FIG. 2, the HDMI module 51 comprises one processor 55. In an alternative embodiment, the HDMI module 51 comprises multiple processors. The processor 55 of the HDMI module 51 may be a general-purpose processor, e.g. ARM-based, or an application-specific processor. The processor 55 of the HDMI module 51 may run a Unix-based operating system for example. The memory 57 may comprise one or more memory units. The memory 57 may comprise solid-state memory, for example.

The receiver 53 and the transmitter 54 may use one or more wired or wireless communication technologies such as Zigbee to communicate with the bridge 41 and HDMI to communicate with the display device 67 and with local media receivers 63 and 64, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver.

The HDMI module 51 may comprise other components typical for a network device such as a power connector. The invention may be implemented using a computer program running on one or more processors. In an alternative embodiment, HDMI module logic may be built-in in the display device 67. Media receivers 31 and 32 may then also be comprised in the display device, e.g., a smart TV.

Figure 3:
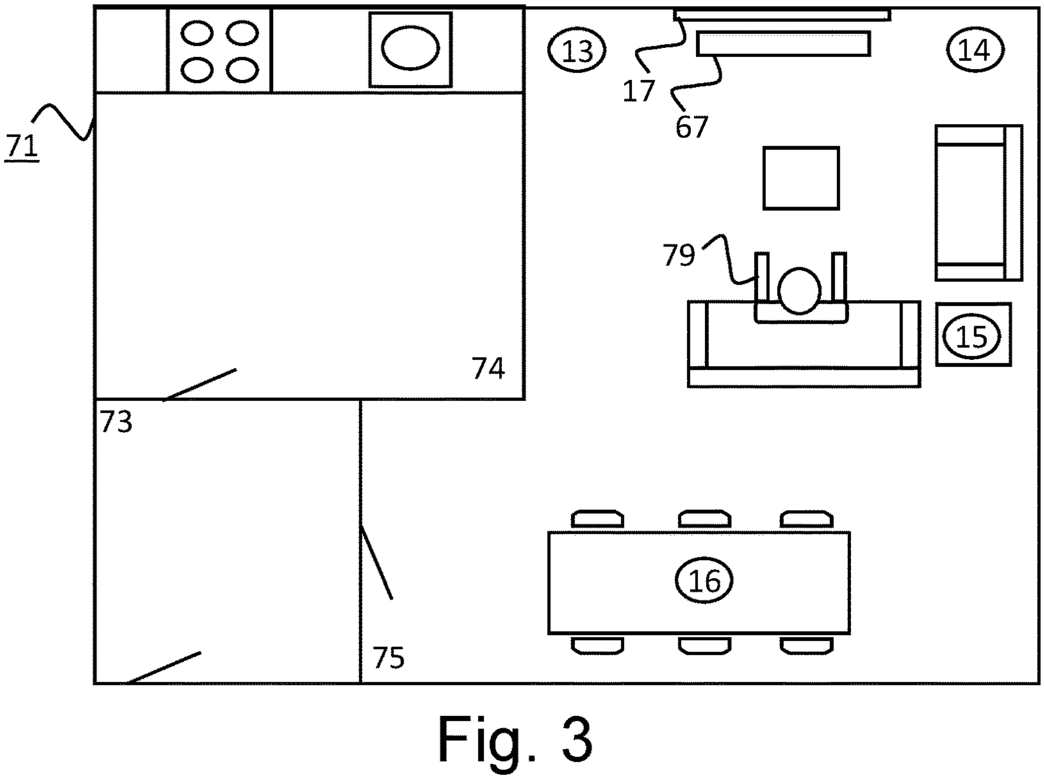
FIG. 3 shows an example of a home in which the lighting devices of FIGS. 1 and 2 have been placed.

FIG. 3 shows an example of a home in which the lighting devices of FIGS. 1 and 2 have been placed. A floor 71 comprises a hallway 73, a kitchen 74, and a living room 75. The lighting devices 13-17 and the display device 67 have been placed in the living room 75. A person 79 is sitting on a couch in the living room 75.

For certain light effects, the lighting devices need to be close enough together such that the light effect is perceived as a single light effect instead of as different light effects being rendered by different lighting devices. Whether lighting devices are close enough together typically depends on the distance between the user and the lighting devices, so this distance is preferably taken into account. This distance may be calculated based on the position of the user and the positions of the lighting devices. Position information indicating the positions of the lighting devices may be received from the lighting devices. The position of a personal device of the user may be used as an estimate of the user position.

The real distance may be assumed to be the user-perceived distance. However, as the distance perceived by the user may not be the same as the real distance, it may be beneficial to adjust the real distance to more closely reflect the user-perceived distance. For example, the angular size of a group of lighting devices, i.e. the apparent size of the group of lighting devices as seen by the user, may be used as a metric for selecting the lighting devices.

To implement this, the processor 5 of the mobile device 1 of FIG. 1 or the processor 45 of the lighting system 31 of FIG. 2 may be configured to obtain, via the receiver 3 or receiver 43, further distance information indicative of a user-perceived distance between a user, e.g. person 79, and the lighting devices 13-17, and select the set of lighting devices from the lighting devices 13-17 further based on this user-perceived distance. For example, real distances may be adjusted based on an analysis of camera images of the lighting devices.

When the person 79 is watching the display device 67 and wants some of the lighting devices 13-17 to render light effects based on the audio and/or video content rendered on the display device 67 (as described in relation to FIG. 2), whether lighting devices are close enough together may also depend on the distance between the display device 67 and the lighting devices. The real distance may be assumed to be the user-perceived distance. However, as the distance perceived by the user may not be the same as the real distance, it may be beneficial to adjust the real distance in order to more closely reflect the user-perceived distance. For example, the angular size of a media rendering device, i.e. the apparent size of the media rendering device as seen by the user, may be used as a metric for selecting the lighting devices. For instance, a larger TV size may result in a smaller user-perceived distance between the TV and the lighting devices.

To implement this, the processor 45 of the lighting system 31 of FIG. 2 may be configured to obtain, via the receiver 43, further distance information indicative of a user-perceived distance between the lighting device 13-17 and the display device 67 rendering the audio and/or video content and select the set of lighting devices from the lighting devices 13-17 further based on the user-perceived distance between the lighting device 13-17 and the display device 67.

In houses, where the user-perceived distance between user and lighting devices and the user-perceived distance between media rendering device and lighting devices are typically smaller, a maximum distance between lighting devices selected for rendering light effects based on the content signal may be e.g. 1 meter. In larger professional installations, where the user-perceived distance between user and lighting devices and the user-perceived distance between media rendering device and lighting devices are typically larger, a maximum distance between lighting devices selected for rendering light effects based on the content signal may be e.g. 5-10 meters.

Figure 4:
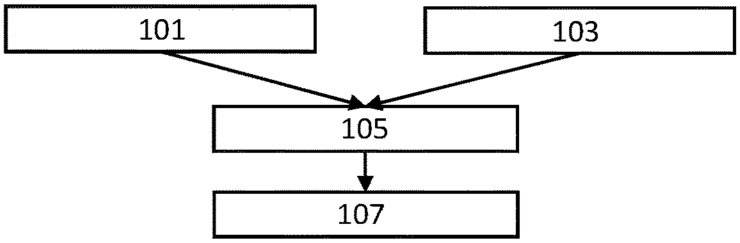
FIG. 4 is a flow diagram of a first embodiment of the method.

A first embodiment of the method of controlling one or more lighting devices to render a light effect is shown in FIG. 4. The method may be performed by the mobile device 1 of FIG. 1 or the lighting system 31 of FIG. 2, for example. A step 101 comprises obtaining distance information. The distance information is indicative of distances between a plurality of lighting devices. A step 103 comprises receiving an input signal indicative of a light effect.

A step 105 comprises selecting a set of lighting devices from the plurality of lighting devices based on the light effect indicated in the input signal received in step 103 and the distances indicated in the distance information obtained in step 101. For example, step 105 may comprise selecting a first set of multiple lighting devices if the light effect is a moving light effect and a second, larger set of multiple lighting devices if the light effect is a non-moving light effect. The moving light effect is a light effect that moves across multiple lighting devices, e.g. a swarm light effect. The second set may comprise all lighting devices of the plurality of lighting devices, for example. A step 107 comprises controlling only the set of lighting devices selected in step 105 to render the light effect.

When lighting devices involved in rendering a light effect are too far apart, they may appear to be rendering unrelated light effects. By only selecting lighting devices that are sufficiently near each other to be able to render a certain light effect in a visually pleasing manner, this may be prevented. Not all light effects require the lighting devices involved in their rendering to be near each other and two light effects that both require the lighting devices involved in their rendering to be near each other may have different nearness/distance requirements.

For example, if the input signal indicates a candle effect, then all of the lighting devices may be selected, if the input signal indicates a fire effect, then a larger subset of the lighting devices may be selected, and if the input signal indicates a swarm effect, then a smaller subset of the lighting devices may be selected. Swarm effects are most visually pleasing when distances between luminaires are within specific ranges. In step 105, it may be determined which lighting devices fall within this range, preferably not restricted to a 2D plane. Lighting devices over multiple areas may be taken into consideration, e.g. lighting devices in the living room and in the garden adjacent to the living room.

Figure 5:
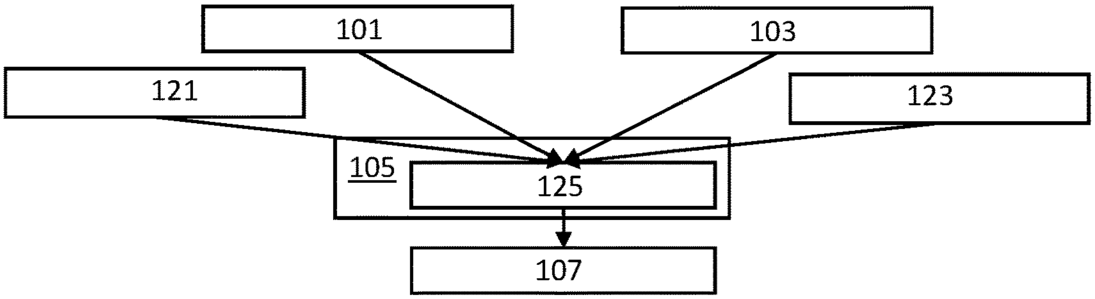
FIG. 5 is a flow diagram of a second embodiment of the method.

A second embodiment of the method of controlling one or more lighting devices to render a light effect is shown in FIG. 5. The method may be performed by the mobile phone 1 of FIG. 1 or the lighting system 31 of FIG. 2, for example. The second embodiment of FIG. 5 is an extension of the first embodiment of FIG. 4. In the embodiment of FIG. 5, additional steps 121 and 123 are performed before step 105 is performed and step 105 of FIG. 4 is implemented by a step 125.

Step 121 comprises obtaining further distance information. The further distance information is indicative of a user-perceived distance between a user and the plurality of lighting devices. In case of a multi-user situation and explicit user control, the further distance information may be indicative of a user-perceived distance between the user who activates/selects light effects and the plurality of lighting devices. Alternatively, in case of a multi-user situation, the further distance information may be indicative of a median or mean distance between the multiple users and the plurality of lighting devices or indicative of a range of distances, e.g., [min distance, max distance], between the multiple users and the plurality of lighting devices. In the latter implementation, a different distance may be used for a first set of light effects than for a second set of light effects. For example, the minimum distance may be used for the first set of light effects and a maximum or average distance may be used for the second set of light effects.

Step 123 comprises obtaining device type information indicative of device types of the plurality of lighting devices. Step 125 comprises selecting a set of lighting devices from the plurality of lighting devices based on the light effect indicated in the input signal received in step 103, the distances indicated in the distance information obtained in step 101, the user-perceived distance between the user and the plurality of lighting devices, as indicated in the further distance information obtained in step 121, and the device types indicated in the device type information obtained in step 123. For example, lighting devices that are only able to render white light or only able to render white light with one color temperature may be excluded from the selected set of lighting devices.

Thus, the selection in step 105 may be based on other inputs than just the indicated light effect and the distances between lighting devices. It may even be possible for a user to limit the selection of light sources that can participate in the rendering of the effect.

In the implementation of FIG. 5, the set of lighting devices is selected from the plurality of lighting devices in step 125 such that for each of the set of lighting devices, a distance between the respective lighting device and at least one other lighting device of the set of lighting devices does not exceed a proximity threshold. In the example of FIG. 3, lighting devices 13, 14, 15, and 17 may be selected if the proximity threshold is 1 meter and lighting devices 13, 14, and 17 may be selected if the proximity threshold is 2 meters, for example.

Figure 6:
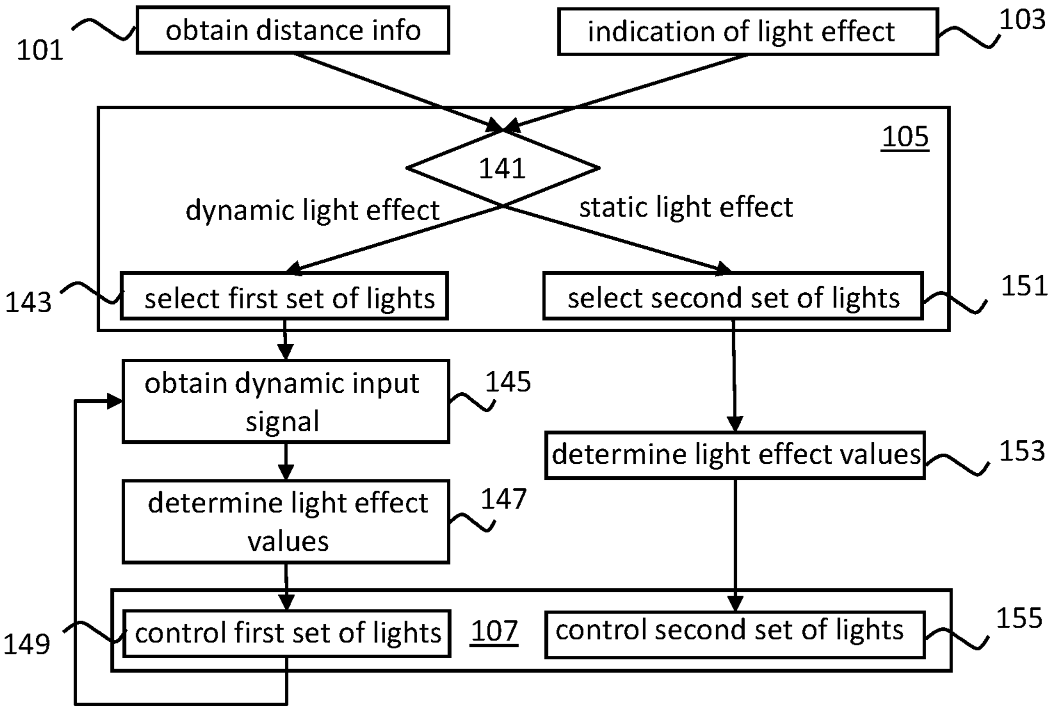
FIG. 6 is a flow diagram of a third embodiment of the method.

A third embodiment of the method of controlling one or more lighting devices to render a light effect is shown in FIG. 6. The method may be performed by the mobile phone 1 of FIG. 1 or the lighting system 31 of FIG. 2, for example.

Step 101 comprises obtaining distance information. The distance information is indicative of distances between a plurality of lighting devices. Step 103 comprises receiving an input signal indicative of the light effect. Step 105 comprises selecting a set of lighting devices from the plurality of lighting devices based on the light effect indicated in the input signal received in step 103 and the distances indicated in the distance information obtained in step 101. Steps 105 comprises sub steps 141, 143, and 151.

Step 141 comprises determining whether the light effect indicated in the input signal is a static light effect or a dynamic light effect that is based on a dynamic input signal that is indicative of values of one or more environmental parameters over time. This dynamic light effect is a moving light effect that moves across multiple lighting devices, e.g. a swarm light effect. The one or more environmental parameters may comprise one or more of a detected activity, a detected motion, a detected sound property, a detected sound level, and a detected number of people.

If the input signal indicates that the dynamic light effect is to be rendered, step 143 is performed. If the input signal indicates that the static light effect is to be rendered, step 151 is performed. Step 143 comprises selecting a first set of multiple lighting devices from the plurality of lighting devices based on the distances indicated in the distance information obtained in step 101. Optionally, the first set of multiple lighting devices is further selected based on the relative proximity of the lighting devices to the device(s) providing the dynamic input signal.

In an implementation, the indicated light effect is only rendered if a sufficient number of lighting devices can be selected in step 143, e.g. at least 5 lighting devices for a swarm light effect. Specific swarm parameters like e.g. number of particles are less ideal to render on a limited number of lighting devices. If it is not possible to render the indicated light effect, this may be reported back to a user and/or another light effect may be selected automatically, for example.

Next a, step 145 comprises obtaining a current part of the dynamic input signal. The dynamic input signal may comprise sensor data, e.g. specify the number of people in the current area, or over multiple areas simultaneously, detected user activity, sound levels, and/or other environmental parameters.

A step 147 comprises determining, for each lighting device of the first set, a current light effect parameter value for the light effect, e.g. a color, a light output level, and/or a value of a higher-level parameter, based on the values of the one or more environmental parameters indicated in the current part of the dynamic input signal obtained in step 145. For example, for a swarm effect, an increase in ambient sound levels may affect the swarm intensity or number of particles.

Step 147 may comprise determining for the light effect a first set of light effect parameter values if an environmental parameter value indicated in the dynamic input signal exceeds a parameter threshold or a second, different set of light effect parameter values if the environmental parameter value indicated in the dynamic input signal does not exceed the parameter threshold.

For example, swarm- or particle-like effects may show a first and a second behavior depending on the dynamic input signal. For instance, they may render a first behavior (and/or appearance) until a significant or threshold change occurs in the dynamic input signal causing them to render the second behavior. Upon the change, the particles change their motion characteristics, e.g. they may freeze or change speed or direction. A significant change in the dynamic input signal may be a change in people activity, a detected emotion (e.g. laughter), audience reaction (e.g. applause) social setting or mood, for example.

Next, a step 149 comprises controlling only the first set of lighting devices selected in step 143 according to the light effect parameter values determined in step 147. Steps 145, 147, and 149 may be repeated multiple times for consecutive parts of the dynamic input signal, e.g. until the dynamic light effect is stopped.

Step 151 comprises selecting a second set of multiple lighting devices from the plurality of lighting devices. Typically, the second set is larger than the first set. A step 153 comprises determining, for each lighting device of the second set, a light effect parameter value for the light effect, e.g. a color and/or a light output level. These light effect parameter values may have previously been associated with the light effect, e.g. specified in a light scene definition. Next, a step 155 comprises controlling only the second set of lighting devices selected in step 151 according to the light effect parameter values determined in step 153.

In the embodiment of FIG. 6, the input signal received in step 103 only indicates one of two types of light effects: a static light effect or a dynamic light effect that is based on a dynamic input signal that is indicative of values of one or more environmental parameters over time. This may be extended to cover other light effects, e.g. a non-moving dynamic light effect. An example of a non-moving dynamic light effect is a candle effect.

Figure 7:
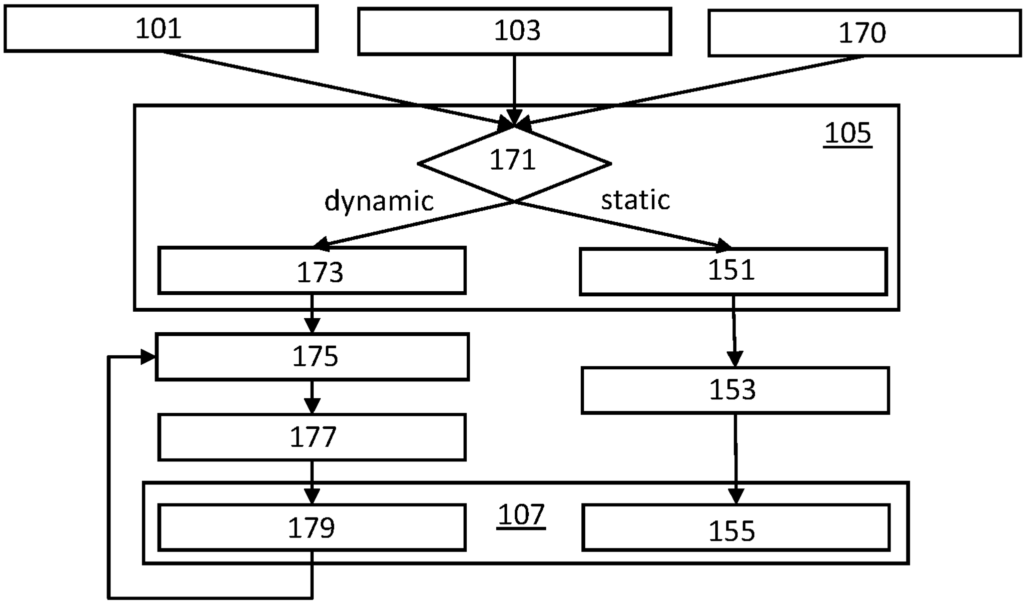
FIG. 7 is a flow diagram of a fourth embodiment of the method.

A fourth embodiment of the method of controlling one or more lighting devices to render a light effect is shown in FIG. 7. The method may be performed by the mobile phone 1 of FIG. 1 or the lighting system 31 of FIG. 2, for example. The fourth embodiment of FIG. 7 is similar to the third embodiment of FIG. 6. In the embodiment of FIG. 7, the dynamic light effect is not based on a dynamic input signal that is indicative of values of one or more environmental parameters over time but based on a content signal comprising audio and/or video content.

In the embodiment of FIG. 7, steps 141, 143, 145, 147, and 149 of FIG. 6 have been replaced with steps 171, 173, 175, 177, and 179, respectively. Furthermore, a step 170 is additionally performed before step 171. Step 170 comprises obtaining further distance information which is indicative of a user-perceived distance between the plurality of lighting devices and a media rendering device rendering the audio and/or video content.

Step 171 comprises determining whether the light effect indicated in the input signal is a static light effect or a dynamic light effect that is based on a content signal which comprises audio and/or video content. If the input signal indicates that the dynamic light effect is to be rendered, step 173 is performed. If the input signal indicates that the static light effect is to be rendered, step 151 is performed.

Step 173 comprises selecting a first set of multiple lighting devices from the plurality of lighting devices based on the distances indicated in the distance information obtained in step 101 and the user-perceived distance between the plurality of lighting devices and the media rendering device, as obtained in step 170. In an alternative embodiment, step 170 is omitted and the first set of lighting devices is not selected based on the user-perceived distance between the plurality of lighting devices and the media rendering device.

Next a, step 175 comprises obtaining a current part of the content signal. The content signal may comprise direct audio input (e.g. from an entertainment system, or streaming from a smart device). The relevant aspects could be in the frequency domain, as well as in the audio format itself (e.g. amount of channels, spatial audio).

A step 177 comprises determining, for each lighting device of the first set, a current light effect parameter value for the light effect, e.g. a color, a light output level and/or a value of a higher-level parameter, based on the audio and/or video content obtained in step 175. Step 177 may comprise determining for the light effect a first set of light effect parameter values if an environmental parameter value indicated in the dynamic input signal exceeds a parameter threshold or a second, different set of light effect parameter values if the environmental parameter value indicated in the dynamic input signal does not exceed the parameter threshold.

For example, swarm effects may be based on the properties of audio or video content rendered on a media rendering device such as a loudspeaker and/or display screen, preferably while being adjusted to the position of the media rendering device or based on a virtual position of the content parts such as a spatial sound entity being rendered relative to multiple loudspeaker positions, or a video entity rendered on a part of a display screen. For instance, the dropping of a beat in music may change the current motion direction of the swarm.

Swarm- or particle-like effects may show a first and a second behavior depending on the content signal. For instance, they may render a first behavior (and/or appearance) until a significant or threshold change occurs in the content signal causing them to render the second behavior. Upon the change, the particles change their motion characteristics, e.g. they may freeze or change speed or direction. A significant change in the input signal could be a music drop or a movie scene change, for example.

Next, a step 179 comprises controlling only the first set of lighting devices selected in step 173 according to the light effect parameter values determined in step 177. Steps 175, 177, and 179 may be repeated multiple times for consecutive parts of the content signal, e.g. until the dynamic light effect is stopped.

Figure 8:
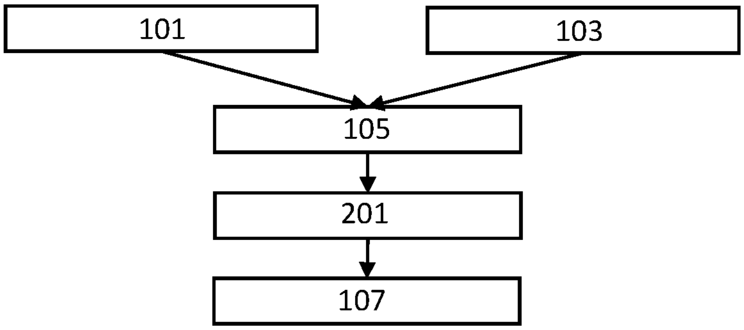
FIG. 8 is a flow diagram of a fifth embodiment of the method.

A fifth embodiment of the method of controlling one or more lighting devices to render a light effect is shown in FIG. 8. The method may be performed by the mobile phone 1 of FIG. 1 or the lighting system 31 of FIG. 2, for example. The fifth embodiment of FIG. 8 is an extension of the first embodiment of FIG. 4. In the embodiment of FIG. 8, a step 201 is performed between steps 105 and 107.

Step 201 comprises determining or adjusting values of one or more light effect parameters of the light effect based on the distances indicated in the distance information obtained in step 101. For example, for a swarm light effect, the distance between the lighting devices may define how quickly/slowly each lighting device dims down or up to simulate the state when a "swarm pixel" is in between the two light sources.

Figure 9:
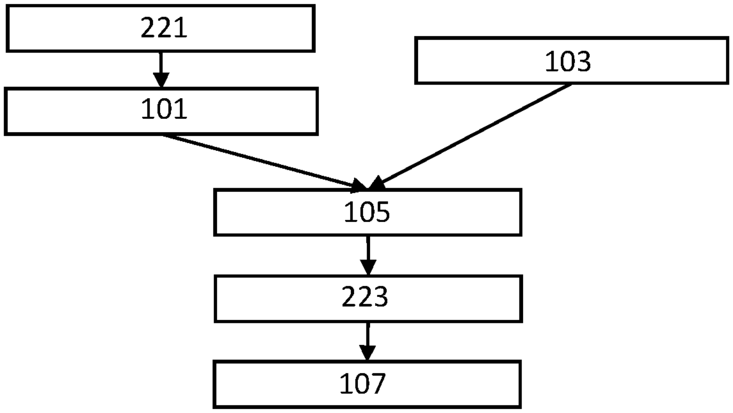
FIG. 9 is a flow diagram of a sixth embodiment of the method.

A sixth embodiment of the method of controlling one or more lighting devices to render a light effect is shown in FIG. 9. The method may be performed by the mobile phone 1 of FIG. 1 or the lighting system 31 of FIG. 2, for example. The sixth embodiment of FIG. 9 is an extension of the first embodiment of FIG. 4. In the embodiment of FIG. 9, a step 221 is performed before step 101 and a step 223 is performed between steps 105 and 107.

Step 221 comprises obtaining position information which is indicative of positions of the selected set of lighting devices. Step 223 comprises determining or adjusting values of one or more light effect parameters of the light effect based on the positions indicated in the position information obtained in step 221. For example, a change in particle swarm behavior may be based on the positions of the lighting devices, e.g. towards the periphery of the set of lighting devices or towards a lighting device of a specific type.

A change in particle swarm behavior may depend on other factors as well. For example, particle swarm behavior may be away from the user, media rendering device or window or towards/away from a detected sensor event (e.g. user laughing, screaming). If the light effect parameters are based on a dynamic input signal, this dynamic input signal may come from an advanced sensor device such as a camera or microphone array which monitors activities in an area. In that case, the advanced sensor device may be able to detect the position of a detected event, and lighting devices near the position of this event may be selected or swarm effects may be adapted to move towards or away from the determined position of the event.

The embodiments of FIGS. 4 to 9 differ from each other in multiple aspects, i.e., multiple steps have been added or replaced. In variations on these embodiments, only a subset of these steps is added or replaced and/or one or more steps is omitted. For example, step 121 may be omitted from the embodiment of FIG. 5 and/or added to any of the other embodiments and/or step 123 may be omitted from the embodiment of FIG. 5 and/or added to any of the other embodiments.

If step 121 is omitted from the embodiment of FIG. 5, step 125 is changed accordingly: the set of lighting devices is not selected based on the user-perceived distance between the user and the plurality of lighting devices. If step 123 is omitted from the embodiment of FIG. 5, step 125 is changed accordingly: the set of lighting devices is not selected based on the device types.

Multiple of the embodiments may be combined. As a first example, the embodiments of FIGS. 6 and 7 may be combined. As a second example, the embodiments of FIGS. 8 and 9 may be combined.

Figure 10:
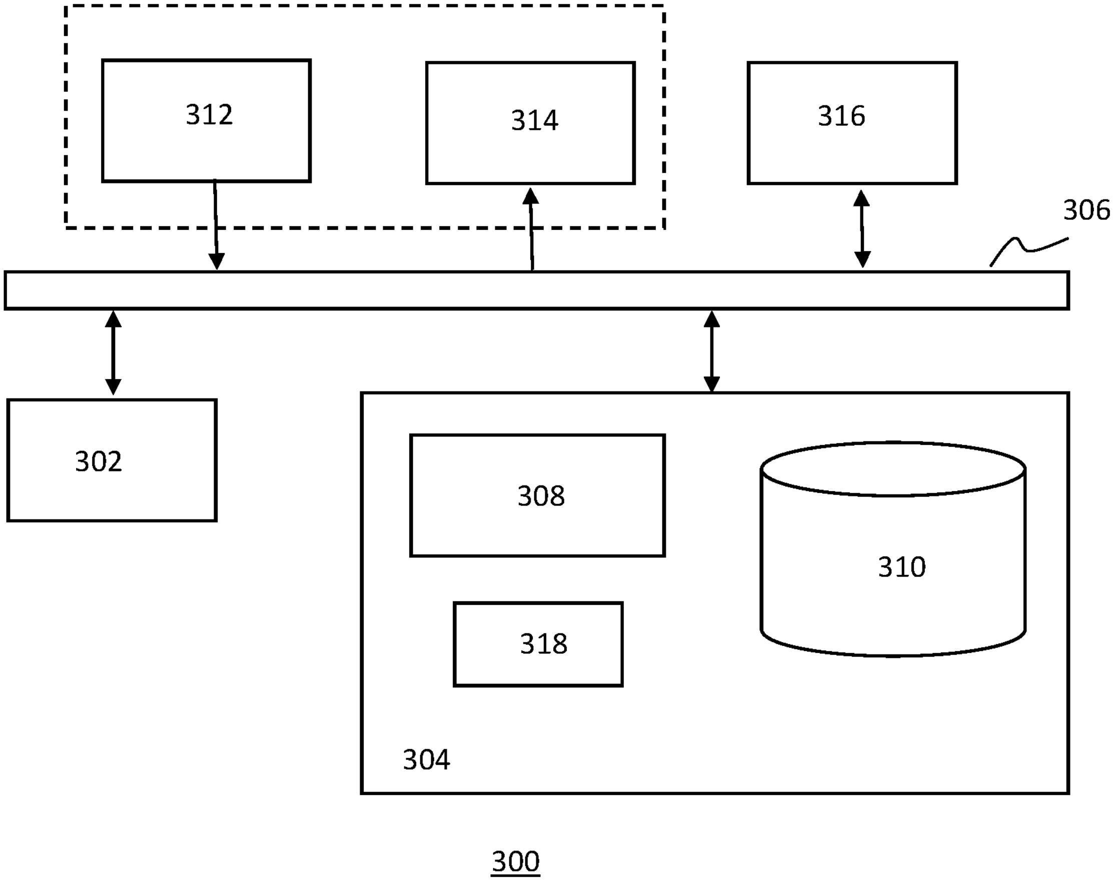
FIG. 10 is a block diagram of an exemplary data processing system for performing the method of the invention.

FIG. 10 depicts a block diagram illustrating an exemplary data processing system that may perform the method as described with reference to FIGS. 4 to 9.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g., for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 10) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling one or more lighting devices to render a light effect, said system comprising:

at least one input interface;

at least one transmitter; and at least one processor configured to:

obtain distance information via said at least one input interface, said distance information being indicative of distances between a plurality of lighting devices, receive an input signal indicative of said light effect, select a set of lighting devices from said plurality of lighting devices based on said light effect and said distances, wherein a first set of multiple lighting devices is selected when said light effect is a moving light effect and a second set of multiple lighting devices is selected when said light effect is a non-moving light effect, said second set of lighting devices being larger than said first set of lighting devices, said moving light effect being a light effect that moves across multiple lighting devices, and control, via said at least one transmitter, only said selected set of lighting devices to render said light effect.

2. The system as claimed in claim 1, wherein said second set comprises all lighting devices of said plurality of lighting devices.

3. The system as claimed in claim 1, wherein said at least one processor is configured to select said set of lighting devices from said plurality of lighting devices such that for each of said set of lighting devices, a distance between said respective lighting device and at least one other lighting device of said set of lighting devices does not exceed a proximity threshold.

4. The system as claimed in claim 1, wherein said at least one processor is configured to:

obtain further distance information via said at least one input interface, said further distance information being indicative of a user-perceived distance between a user and said plurality of lighting devices, and select said set of lighting devices from said plurality of lighting devices further based on said user-perceived distance between said user and said plurality of lighting devices.

5. The system as claimed in claim 1, wherein said at least one processor is configured to:

obtain device type information indicative of device types of said plurality of lighting devices, and select said set of lighting devices from said plurality of lighting devices further based on said device types of said plurality of lighting devices.

6. The system as claimed in claim 1, wherein said at least one processor is configured to:

obtain a dynamic input signal, said dynamic input signal being indicative of values of one or more environmental parameters over time, and determine consecutive light effect parameter values for said light effect based on said values of said one or more environmental parameters.

7. The system as claimed in claim 6, wherein said one or more environmental parameters comprise at least one of a detected activity, a detected motion, a detected sound property, a detected sound level, and a detected number of people.

8. The system as claimed in claim 6, wherein said at least one processor is configured to determine for said light effect a first set of light effect parameter values when an environmental parameter value indicated in said dynamic input signal exceeds a parameter threshold or a second set of light effect parameter values when said environmental parameter value indicated in said dynamic input signal does not exceed said parameter threshold, said first set of light effect parameter values being different from said second set of light effect parameter values.

9. The system as claimed in claim 1, wherein said at least one processor is configured to:

obtain a content signal comprising audio and/or video content, and determine consecutive light effect parameter values for said light effect based on said audio and/or video content.

10. The system as claimed in claim 9, wherein said at least one processor is configured to:

obtain further distance information via said at least one input interface, said further distance information being indicative of a user-perceived distance between said plurality of lighting devices and a media rendering device rendering said audio and/or video content, and select said set of lighting devices from said plurality of lighting devices further based on said user-perceived distance between said plurality of lighting devices and said media rendering device.

11. The system as claimed in claim 1, wherein said at least one processor is configured to determine or adjust values of one or more light effect parameters of said light effect based on said distances.

12. The system as claimed in claim 1, wherein said at least one processor is configured to:

obtain position information via said at least one input interface, said position information being indicative of positions of said selected set of lighting devices, and determine or adjust values of one or more light effect parameters of said light effect based on said positions.

13. A method of controlling one or more lighting devices to render a light effect, said method comprising:

obtaining distance information, said distance information being indicative of distances between a plurality of lighting devices;

receiving an input signal indicative of said light effect;

selecting a set of lighting devices from said plurality of lighting devices based on said light effect and said distances, wherein a first set of multiple lighting devices is selected when said light effect is a moving light effect and a second set of multiple lighting devices is selected when said light effect is a non-moving light effect, said second set of lighting devices being larger than said first set of lighting devices, said moving light effect being a light effect that moves across multiple lighting devices; and controlling only said selected set of lighting devices to render said light effect.

14. A non-transitory computer-readable medium having stored thereon a computer program to perform the method of claim 13 when run on a processor.

* * * * *